J. B. JOHNSTON.
Horseshoe Calk-Blank Bar.
No. 163,316.  Patented May 18, 1875.
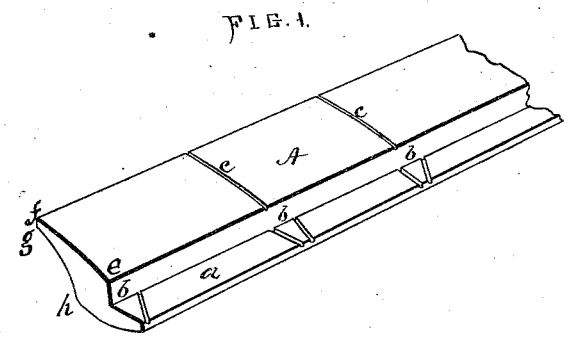
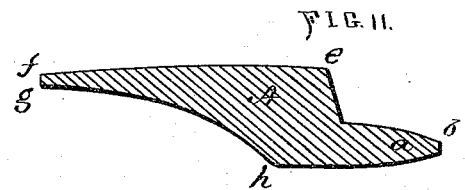
Witnesses.
F. B. Townsend,
Will. H. Moxon
Inventor
James B. Johnston
per Attys.
A. H. Evans + Co.

UNITED STATES PATENT OFFICE.

JAMES B. JOHNSTON, OF CHICAGO, ILLINOIS, ASSIGNOR TO ROBERT W. HALE, OF SAME PLACE.

IMPROVEMENT IN HORSESHOE-CALK-BLANK BARS.

Specification forming part of Letters Patent No. 163,316, dated May 18, 1875; application filed April 1, 1875.

*To all whom it may concern:*

Be it known that I, JAMES B. JOHNSTON, of Chicago, Illinois, have invented a new and useful Improvement in the Manner of Preparing Horseshoe-Calks, of which the following is a full, clear, and exact description, reference being had to the accompanying drawings, making a part of this specification, in which—

Figure 1 is a perspective view of my invention. Fig. 2 is a cross-section of the same.

My invention has reference to calks which are attached to the toes of horseshoes; and it consists in forming a bar of a shape to correspond with the curve and pitch of the hoof and shoe, and having an interior curve suited to the interior curvature of the hoof.

To enable others skilled in the art to make and use my invention, I will proceed to state the exact manner in which I have carried it out.

In the drawings, A represents a bar, of iron or steel. struck up in the proper form for the calk. The extended edge or flange $a$ supplies the stub $b$, which remains attached to the finished calk, that portion between the stubs $b$ being cut away in the process of finishing. The line or gash $c$ across the bar indicates the point for separating the calks, as needed for use.

In forming the blank bar A I give it a gentle curve or swell from the point $e$ to the point $f$, in order to secure a corresponding pitch to the calk with the pitch of the hoof and shoe, thus rendering the tread more easy and natural, while the interior of the calk from $g$ to $h$ is a concave corresponding as near as may be with the concavity of the hoof.

By this means I am enabled to supply the trade with an article which will enable smiths to cut and prepare calks for horseshoes with the form adapted to the natural shape and curvature of the hoof, and with but comparatively little labor and expense.

Having thus explained my invention, what I claim as new, and desire to secure by Letters Patent, is—

As a new article of manufacture, a calk-blank bar shaped and formed substantially as and for the purpose set forth.

JAMES B. JOHNSTON.

Witnesses:
CHAS. L. RISING,
C. J. LANE.